United States Patent [19]

Brekkestran et al.

[11] Patent Number: 5,105,067

[45] Date of Patent: Apr. 14, 1992

[54] ELECTRONIC CONTROL SYSTEM AND METHOD FOR COLD WEATHER GARMENT

[75] Inventors: Kevin L. Brekkestran; Kamyab Aghai-Tabriz; Nghia N. Nguyen, all of Fargo; Barry D. Batcheller, West Fargo, all of N. Dak.

[73] Assignee: Environwear, Inc., Fargo, N. Dak.

[21] Appl. No.: 405,626

[22] Filed: Sep. 8, 1989

[51] Int. Cl.⁵ ............................................. A05B 1/02
[52] U.S. Cl. ................................. 219/497; 219/483; 219/486; 219/211; 219/508; 2/69
[58] Field of Search .............. 219/211, 212, 494, 497, 219/499, 501, 505, 508-509; 2/69, 81, 2

[56] References Cited

U.S. PATENT DOCUMENTS

| | | | |
|---|---|---|---|
| 3,363,087 | 1/1968 | Buxbaum et al. | 219/301 |
| 3,783,240 | 1/1974 | Drummond, Jr. | |
| 3,789,190 | 1/1974 | Orosy et al. | 219/497 |
| 4,042,803 | 8/1977 | Bickford | 219/211 |
| 4,087,675 | 5/1978 | Sansonetti | 219/211 |
| 4,113,391 | 9/1978 | Minowa | 219/483 |
| 4,132,262 | 1/1979 | Wibell | 219/212 |
| 4,251,718 | 2/1981 | Cole | 219/501 |
| 4,274,145 | 6/1981 | Hendricks et al. | 236/46 R |
| 4,277,670 | 7/1981 | Mori et al. | 219/492 |
| 4,359,626 | 11/1982 | Potter | 219/490 |
| 4,404,460 | 9/1983 | Kerr | 219/497 |
| 4,485,296 | 11/1984 | Ueda et al. | 219/505 |
| 4,523,084 | 6/1985 | Tamura et al. | 219/497 |
| 4,549,074 | 10/1985 | Matsuo | 219/505 |
| 4,657,572 | 4/1987 | Desai et al. | 219/486 |
| 4,723,068 | 2/1988 | Kasuda | 219/486 |
| 4,798,936 | 1/1989 | Johnson, Sr. | 219/211 |
| 4,858,576 | 8/1989 | Jeffries et al. | 219/497 |
| 4,920,252 | 4/1990 | Yoshino | 219/486 |

FOREIGN PATENT DOCUMENTS 57-13526 6/1981 Japan .

Primary Examiner—Mark H. Paschall
Attorney, Agent, or Firm—Harness, Dickey & Pierce

[57] ABSTRACT

A microcomputer-based, closed-loop electronic temperature control system and method for an electrically heated cold weather garment having a plurality of independently heated zones. In one preferred embodiment the system comprises a potentiometer for selecting the desired temperature at which a plurality of areas of the garment are to be maintained, a thermistor for determining a reference temperature of the interior areas of the garment, and a plurality of conductive heating wires operable to heat each area of the garment independently. The system further includes a plurality of solid-state semiconductor power devices for controllably allowing current flow through each heating wire and, a plurality of current sensing circuits for sensing the current flow through each heating wire. The microcomputer receives information from the potentiometer, the thermistor and the current sensing circuits, and determines therefrom the level of heating required for each zone. The microcomputer then generates and applies a plurality of pulse width modulated output signals to the solid-state switches to thereby control the amount of heat produced by each heating wire, thus controlling the temperature of each zone.

32 Claims, 5 Drawing Sheets

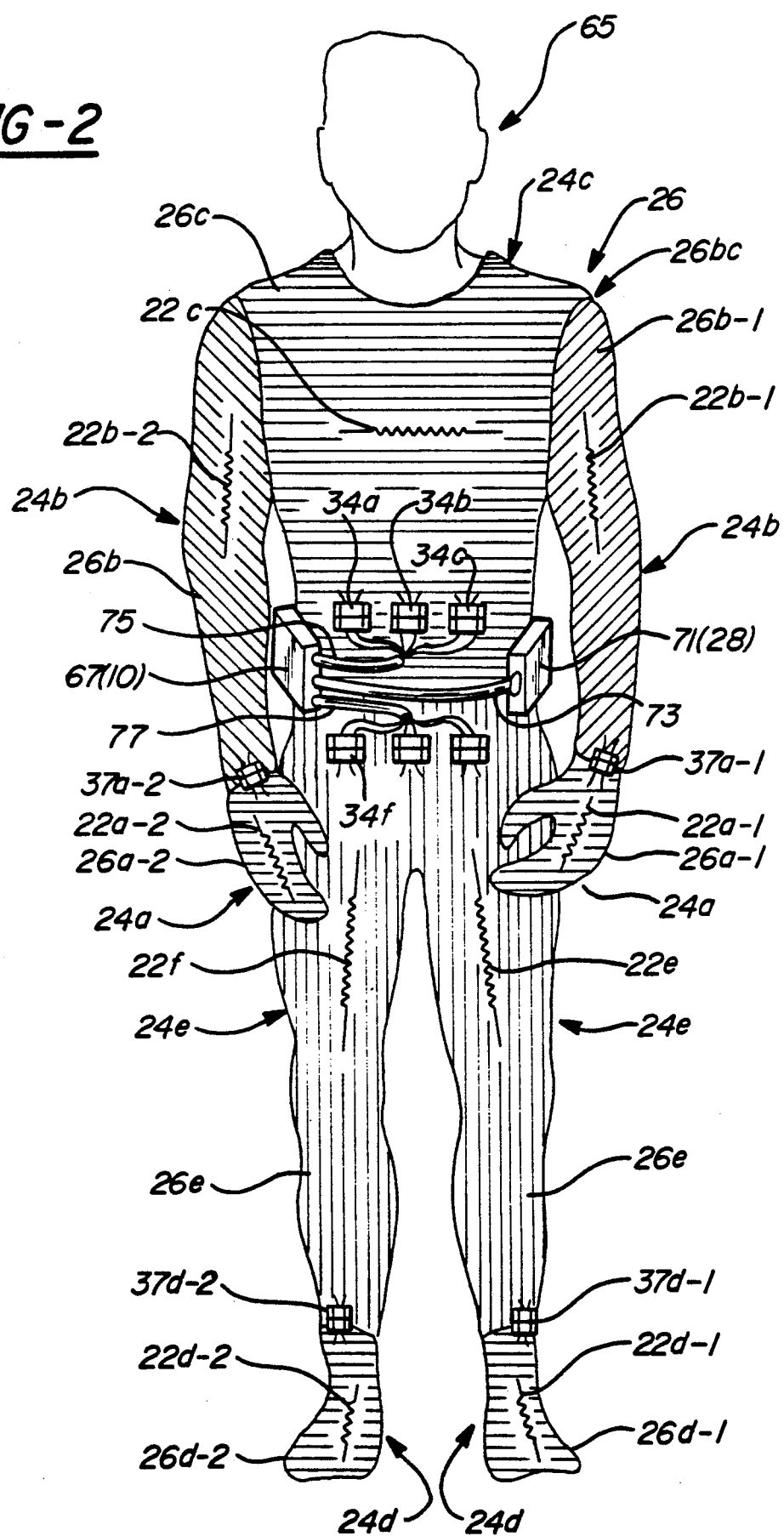

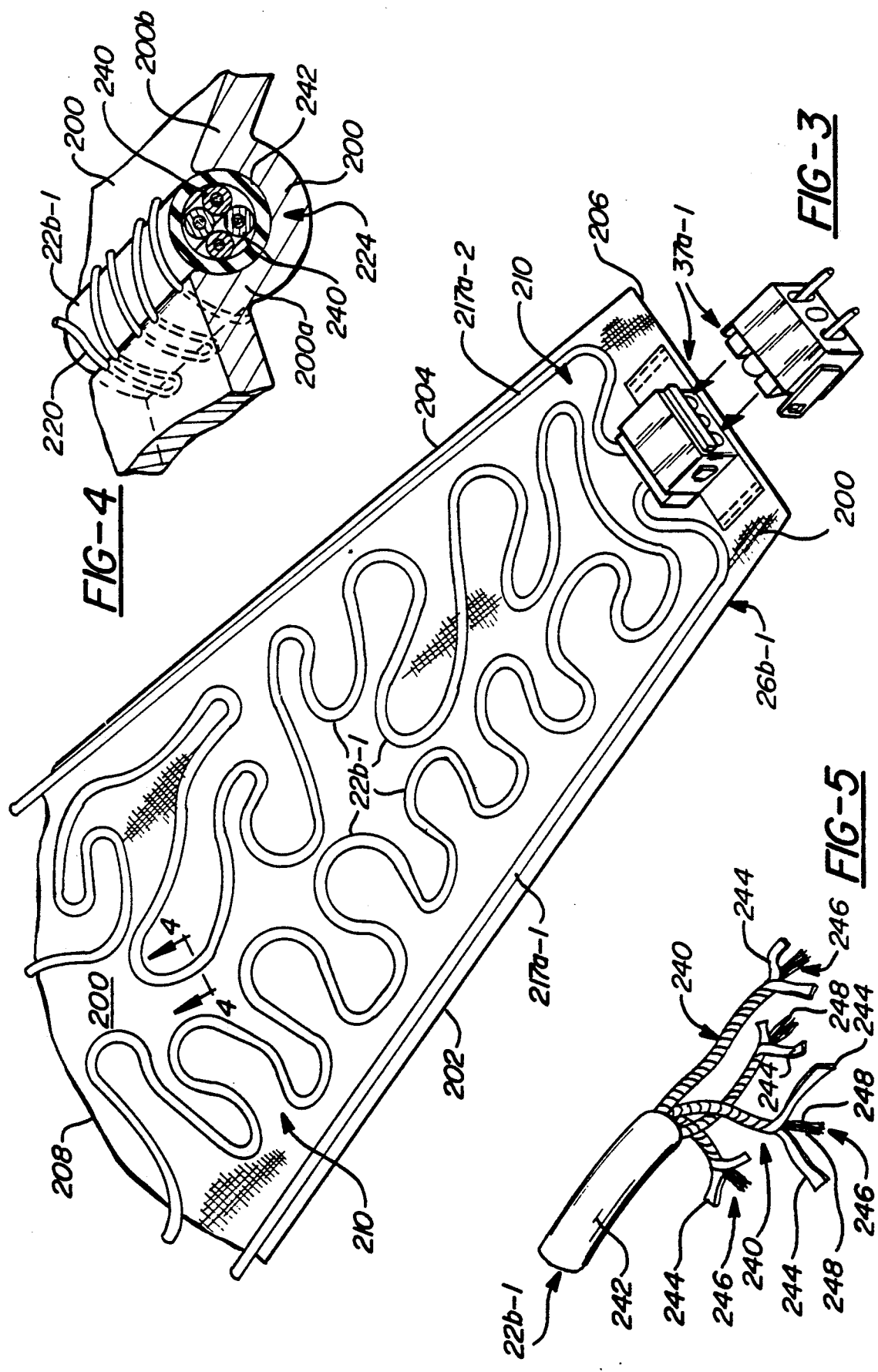

ELECTRONIC CONTROL SYSTEM AND METHOD FOR COLD WEATHER GARMENT

CROSS-REFERENCE TO RELATED APPLICATIONS

The present application is related to the following, co-pending applications filed concurrently herewith:

"Hybrid Electronic Control System and Method For Cold Weather Garment", application Ser. No. 07/405,142;

"Fused Electrical Connector With Sewing Wings", application Ser. No. 07/405,887, now U.S. Pat. No. 4,927,366;

"Electrically Heated Form-Fitting Fabric Assembly", application Ser. No. 07/404/827; and "Electrically Heated Garment", application Ser. No. 07/405,627.

The disclosures of all of the applications cited above are hereby incorporated by reference and made a part hereof the same as if fully set forth herein.

BACKGROUND OF THE INVENTION

1. Technical Field

This invention relates to control systems for electrically heated, cold weather garments, and more particularly to an electronic control system and method for controlling the ambient temperature within an electrically heated, cold weather garment.

2. Discussion

Electrically heated garments, or portions thereof, are helpful in combatting the effects of cold temperatures on a person subject to prolonged exposure to the cold. More specifically, a heated garment can prove helpful to persons such as sportsmen, farmers, construction workers, public officials, military personnel, etc. who frequently are exposed to cold weather for prolonged periods of time.

Problems with prior art electronic control systems for heated garments have existed with respect to the ability to heat a plurality of discrete zones of the garment independently. Heating different zones individually is desirable because of the varying rate at which different parts of the body lose heat. The extremities (i.e., hands, feet and head), for example, suffer a greater heat loss than the torso. In addition, physical activities of the wearer of the garment can cause different body parts of the wearer to generate heat at varying levels. A system which applies the same level of heat to all areas of the garment can therefore produce a temperatures in at least some of the zones within the garment that is uncomfortable to the wearer.

Prior art electronic control systems, to be able to sense and control the heat applied to various zones of the garment independently, typically require a heat sensing means, for example, a thermistor, located within each particular area of the garment to be sensed. Examples of systems that require, or would appear to require, a plurality of temperature sensing and/or selection devices for independently controlling various discrete heating elements of a garment are disclosed in the following U.S. patents:

| U.S. Pat No. | Issued | Inventor(s) |
|---|---|---|
| 710,429 | 1902 | Collins et al |
| 2,579,383 | 1951 | Goudsmit |
| 3,084,241 | 1963 | Carrona |
| 3,293,405 | 1966 | Costanzo |
| 3,648,745 | 1972 | Starr |
| 3,648,764 | 1972 | Starr |

Such systems also typically require a temperature selection device, for example, a thermostat, for controlling the temperature of a particular area of the garment.

The need for multiple, discrete temperature sensors and selection devices complicates the temperature control circuit and adds to the cost of the system, while detracting from the overall reliability of the system. Systems requiring a plurality of such elements further detract from the convenience to the wearer, who may have to periodically readjust numerous temperature selection devices as weather conditions or physical activities of the wearer change.

It is therefore a principal object of the present invention to provide an electronic temperature control system for controlling the temperature of a plurality of predetermined zones of a cold weather garment independently of each other.

It is further an object of the present invention to provide a temperature control system and a method capable of automatically regulating the ambient temperature within each zone of the garment independently of the other zones.

It is yet another object of the present invention to provide a control system which accomplishes this automatic control of temperature in each zone without the need for a discrete temperature sensing device to be disposed within each zone of the garment.

It is still a further object of the present invention to provide a temperature control system capable of rapidly increasing or decreasing the temperature within each zone independently of the other zones.

It is another objective of the present invention to provide a temperature control system operable to maintain a plurality of independent areas of the garment at the same temperature in response to an input from a single temperature selection device, thereby promoting the convenient use of the system.

SUMMARY OF THE INVENTION

The present invention overcomes the limitations of prior art temperature control systems for electrically heated garments by providing an electronic control system capable of regulating the temperature of a plurality of discrete, enclosed areas independently of each other.

The control system of the present invention uses: a temperature selection device for selecting a temperature at which a plurality of independent areas are to be maintained; means for sensing the temperatures of the independent areas substantially simultaneously; a plurality of heating means for heating independently and substantially simultaneously the independent areas; and control means for receiving information from the temperature selection device and the temperature sensing means, and using the information to control each heating means independently in accordance with the temperature selection device.

BRIEF DESCRIPTION OF THE DRAWINGS

The various features and advantages of the present invention will become apparent to those skilled in the art upon reading the following specification and subjoined claims, and by reference to the drawings wherein like reference numerals designate similar components in the various Figures, and in which:

FIG. 2 is an illustration of one possible arrangement of the FIG. 1 control system and full body electrically heated garment including several independent heating zones, with a highly simplified representation of the resistive heating elements within each zone;

FIG. 3 is an perspective view of the arm panel of fabric for the garment, prior to its longitudinal edges being sewn together, which shows the serpentine pattern in which the wire heating element is preferably arranged;

FIG. 4 is a highly enlarged perspective, cross-sectional view of a fragment of the FIG. 3 arm panel taken along line 4—4 of FIG. 3 and illustrating the cover stitching holding a wire heating element to the fabric in a manner which pulls the fabric upwardly to partially circumscribe the wire heating element;

FIG. 5 is a perspective view showing the construction of a multiple conductor tinsel wire with an outer insulating jacket that is a preferred wire heating element for the FIG. 2 garment;

DETAILED DESCRIPTION OF THE PREFERRED EMBODIMENTS

Figure 1:
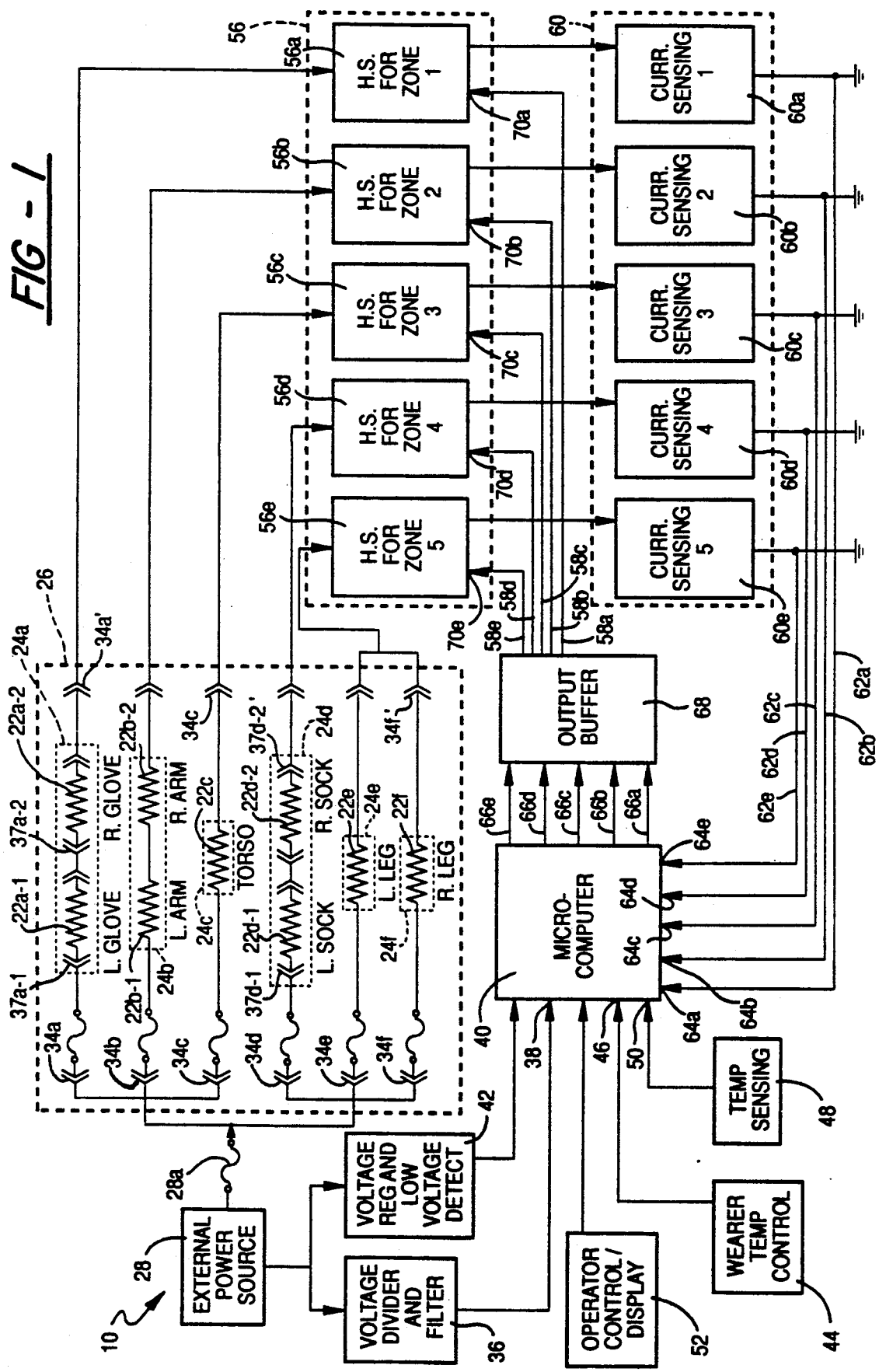
FIG. 1 is a simplified block diagram of the overall electronic control system of the present invention for an electrically heated cold weather garment showing a group of heating elements in the garment, a group of heating element power switches, a group of current sensing circuits, an output buffer, a microcomputer which operates the system, and the various inputs received by the microcomputer.

FIG. 1 illustrates a simplified block diagram of the overall electronic control system 10 of the present invention. The system 10 includes: a microcomputer 40 for controlling the overall operation of the system; an external power supply 28; a voltage divider module 36 and a conventional voltage regulator and low-voltage detect circuit 42. The electrically heated garment 26, represented as a block of dashed lines, includes a plurality of distinct heating zones 24a through 24e operated independently of one another. Each zone 24 includes one or more heating elements, which are collectively identified as a group 22 of heating elements 22a-1 through 24f, which will be further explained shortly. The system 10 also includes a group 56 of heater switches 56a through 56e for independently operating the heating elements 22, and a group 60 of current-sensing circuits 60a through 60e. The system 10 also includes an output buffer 68 which conditions control signals used to operate the heater switches 56. Finally, the system 10 includes a wearer adjustable temperature control 44, which may be a potentiometer, and optionally includes a reference temperature sensing device 48 and an operator control/display device 52, with the control/display device 52 having preferably five power adjustment devices 55a through 55e, one switch 52a, and five display devices 55a through 55e. The function of the control/display device will be explained in detail in the following paragraphs. Having described the major components of the control system 10, the manner in which these components are interconnected and the basic purpose of the components will be explained.

The power supply 28, which may be of any conventional or suitable design, supplies low-voltage direct current ("DC") electrical power to three modules or components within the system 10, namely the heating elements 22, the voltage divider module 36 and the voltage regulator module 42. The power supply 28 supplies electrical power to the upper half of the garment, namely the vest, arms and gloves, through heating elements 22a-1 through 22c via electrical connectors 34a, 34b and 34c, and to the lower half of the garment (namely the pants and socks) through heating elements 22d-1 through 22f via electrical connectors 34d, 34e and 34f. Such a power distribution arrangement allows power to be connected to or disconnected from the upper and lower halves of the overall garment 26 with a minimal amount of inconvenience when the garment 26 is removed or put on by a wearer. Additional connectors 37a-1, 37a-2, 37d-1 and 37d-2 are also disposed immediately adjacent the ends of each of heating elements 22a-1, 22a-2, 22d-1 and 22d-2. Connectors 37a and 37d allow the various body panels of the garment 26, as represented by the heating zones 24a through 24e, to be disconnected, thus allowing the garment 26 to be used, for example, as a vest. Each of the connectors 37 and 34 may further contain a removable, built-in fuse, which may be rated, for example, at between about 10 and 20 amps, to provide an additional level of overcurrent protection. A connector like the ones just described is disclosed in aforementioned patent application Ser. No. 07/404,887.

The wearer adjustable temperature control 44 is provided for allowing the wearer of the garment 26 to select a desired temperature at which the zones 24 of the garment 26 are to be maintained and to input information related thereto to the microcomputer 40. A temperature sensing device 48, preferably a thermistor, is also provided for determining an ambient or reference temperature within or near the garment 26 and inputting corresponding information to the microcomputer 40. The operator control/display 52 is provided for allowing calibration procedures to be performed on the system 10 and for visual monitoring of the calibration procedures. The signals from the temperature sensing device 48 and the operator control/display 52 are both used to provide a means for calibrating the temperature sensing mechanisms of the control system 10 and will both be further explained below.

The power supply 28 supplies power to three separate aspects of the system 10. First it supplies a suitable level of electrical power, such as +12 volts DC (VDC), used hereinafter for discussion purposes, to the heating elements 22. In practice, each heating element will be disposed within a zone of the garment 26 (shown in detail in FIG. 2), and a zone may contain one or more heating elements. For example, in the preferred embodiment, the pair of heater elements 22b-1 and 22b-2 will be reserved for the arms, which comprise one zone 24b, with one heater element being located in each arm. The arrangement of the heater elements 22b-1 and 22b-2 again are shown in FIG. 2, and discussed further in the following paragraphs.

Second, power supply 28 also supplies +12 VDC to a voltage divider and filter network 36, which provides +5 VDC to a first analog-to-digital (A/D) port 38 of the microcomputer 40 for use as a reference in calculating the ambient temperature of each zone 24. Third, the output of the power supply 28 also supplies power to a conventional voltage regulator and low voltage detection network module 42. Module 42 provides a highly regulated +5 VDC power to the microcomputer 40 and provides a reset pulse to the microcomputer 40 should the power supply voltage fall below +5 VDC.

As mentioned previously, additional inputs to the microcomputer 40 are a wearer adjustable temperature control 44, which has its analog output signal directed to a second A/D port 46 of the microcomputer 40, and a temperature sensing device 48 which has its analog output signal directed to a third A/D port 50 of the microcomputer 40. The temperature sensing device 48 is preferably disposed within the garment 26 at the waist area to best obtain a representative temperature reading of the interior areas of the garment 26. However, it should be appreciated that the sensing device 48 may be disposed within any area of the garment 26, or even exterior of the garment 26 if so desired. As will later be explained in detail, the device 48 need not be used at all. The operator control/display 52, if used, may be connected to an input port 54 of the microcomputer 40.

The outputs of each heating element group 22 are connected independently to the group 56 of heater switching units 56a–56e, which are independently and controllably activated via a corresponding number of signals on lines 58a–58e from the microcomputer 40. Although heating elements 22e and 22f have been shown as being controlled by a single MOSFET 56e to avoid unnecessarily cluttering the figure, it should be noted that separate MOSFETs should preferably be used to handle the larger current flow that the legs section 24e will most likely require in actual use. Each of the heater switching units 56a–56e will initially be switched on in sequential fashion by a pulse width modulated (PWM) control signal from one of the outputs 66a–66e of the microcomputer 40 corresponding to that particular switching unit 56a–56e. By pulse width modulation signal, we mean a signal consisting of a series of successive digital pulses delivered at a predetermined frequency or clock rate, with each of the pulses being of predetermined duration. The duration or time period during which each digital pulse is high (i.e., supplying a turn-on signal to a particular MOSFET, for example, MOSFET 56a) represents the duty cycle of that particular pulse width modulated signal. As an example, if a particular cycle of a pulse width modulated signal is at a logic-high level for one-quarter of the cycle and at a logic-low level for three-quarters of the cycle, it is said that the duty cycle of the signal is 25%. Put another way, the signal is said high, or active, for 25% of the cycle.

Pulse width modulation has the advantage of avoiding the power loss that would otherwise occur in the MOSFET 56a if an analog signal were applied to it. If an analog signal were to be used rather than a pulse width modulated signal, power would be dissipated in the MOSFET 56a during the time that the MOSFET 56a is in a conducting non-saturated mode. Thus, using pulse width modulation allows the same degree of control over the MOSFET 56a to be achieved without producing the power loss that would otherwise result if an analog signal were used to control the MOSFET 56a. The power loss avoided helps to conserve battery power when the system 10 is being powered by a user-worn battery pack.

When the heater switching units 56a–56e are each activated by the pulse width modulated signals, thereby allowing current flow therethrough, the current flowing through each heating element 22 will flow into a respective current-sensing circuit 60a–60e. Each of the circuits 60a–60e provides a respective low voltage analog signal representing the magnitude of the sensed current, and these analog signals are sent via output lines 62a–62e back into a like plurality of A/D ports 64a–64e on the microcomputer 40.

The resistances of the heating elements 22 will vary in accordance with their temperatures. With this knowledge, the temperature of the heating elements 22, and thus the temperatures of the zones 24, may be determined once the resistances of the heating elements 22 are obtained. The microcomputer 40 performs the function of determining the resistances of the heating elements 22 by using Ohm's Law ($R = E/I$) to calculate the resistance of each heating elements 22 (which will be explained in more detail in the following paragraphs), from which the actual ambient temperatures of the zones 24 will be determined.

Once the ambient temperatures of each of the zones 24 have been determined, the microcomputer 40 applies a plurality of pulse width modulated signals, each having a predetermined duty-cycle, at its outputs 66a–66e, which are then buffered by an output buffer 68 and subsequently applied via lines 58a–58e to switching inputs 70a–70e of the heater switches 56a–56e.

The switching inputs 70a–70e operate to controllably switch the heater switches 56a–56e on and off in accordance with the duty cycles of the pulse width modulated signals, thereby controlling the current flow through each heating element 22 of the garment 26, and thus controlling the heat generated by the heating elements 22 and the temperatures of the zones 24.

FIG. 2 is a pictorial illustration of the overall garment 26 being worn by a man 65. The garment 26 is preferably worn as an under-garment very close to the skin to maximize heat transfer to the body and to allow insulating layers of clothing to be placed over it to help retain heat which the heating elements 22 generate. The garment 26 is preferably tight-fitting, and highly stretchable to minimize air pockets and other spaces between the garment and the skin that tend to trap air, reduce heat transfer, and promote pumping of heated air from within the garment to areas outside the garment.

FIG. 2 shows the different independent heating zones 24a–24e of the garment 26. The heating elements 22a-1–22d-2 are also shown in FIG. 2 as simple resistors to avoid cluttering the Figure. It should be noted that heating elements 22e and 22f are included within a single heating zone, zone 24e. The preferred constitution and pattern of the heating elements will be discussed shortly in connection with FIGS. 3 through 5. The man 65 is shown wearing, at the right side of his waist, a slim lightweight rectangular enclosure 67 which houses the electronics of the control system 10, and, at the left side of his waist, another slim lightweight enclosure 71 which may house any conventional high-energy battery pack. The battery pack may, if desired, serve as the external power supply 28 shown in FIG. 1. A suitable length power cord 73 may be used to connect the pack 71 to system 10 or to another nearby electrical power source.

Electrical wiring harnesses 75 and 77 are used to connect the control system 10 to connectors 34a through 34c and connectors 34d through 34f as shown. Harnesses 75 and 77 are comprised of conventional insulative protective sheathings, additional information of which may be found in aforementioned application Ser. No. 07/405,167. Wiring harness 75 includes conductors therein for supplying power to the heating elements 22a, 22b and 22c of the upper half of the garment 26, while harness 77 is used to house conductors which supply power to the heating elements 22d, 22e and 22f of the lower half of the garment 26.

The overall garment 26 shown in FIG. 2 preferably consists of four separately wearable garment sections, namely: the hand section 26a consisting of hand coverings 26a-1 and 26a-2 to heat the left hand and right hand respectively, the long-sleeve shirt section 26bc covering the arms and torso including the shoulders; the socks section 26d consisting of socks 26d-1 and 26d-2 covering the left foot and right foot respectively; and the pants section 26e covering both legs and the hip area. The hand coverings 26 may be mittens, but preferably are gloves for greater finger dexterity.

In the garment 26 as shown in FIG. 2, heating zone 24a is made up of the two hand coverings 26a. Zone 24b includes the left and right arm sections 26b of the garment 26, while a third zone 24c covers the torso including the shoulders. The socks zone 24d covers both feet including the ankles. The legs zone 24e covers both legs and the hip area. Although five independent zones have been illustrated in FIG. 2, it should be appreciated that any convenient number of discrete independent heating zones may be employed, as long as an appropriate number of power switching devices and independent power level selection circuits are also included in the system 20. For example, an additional zone could be provided so as to heat each hand separately, and/or another zone could be provided to heat the head, assuming of course that another garment section, taking the form of a hood, face mask or the like, is provided.

The garment 26 may be one-piece if desired, but is preferably be constructed as at least a two piece suit comprising a vest or shirt section and a pants section. -The term "vest" is used here in its usual sense as an article of clothing that covers most of the torso, but not the arms. The shirt section may be either long-sleeve or short-sleeve or may have an in, between sleeve length. The pants section may similarly have any desired length of pant leg. Such two (or more) piece constructions allow the garment 26 to be easily and quickly put on and removed, and also allow each section to be used or replaced separately. The hand zone 24a and socks zone 24d are optional, and their respective garment sections 26a and 26d need not be worn unless desired. To facilitate such optional use, the additional electrical connectors 37a-1, 37a-2, 37d-1 and 37d-2 are respectively provided so that the hand coverings 26a-1, 26a-2 and socks 26d-1 and 26d-2 may be individually removed whenever desired.

The two piece suit configuration is facilitated by the two sets of connectors 34a through 34c and 34d through 34f which are preferably located generally where shown in FIG. 2. The connectors 34a through 34f each also preferably contain a built-in fuse which may be sized as desired (for example, at 7 to 8 amps) to provide individual short circuit protection for respective electrical heating elements 22a through 22f in the garment 26. Suitable fused and unfused electrical connector assemblies of the type just mentioned may be attached by sewing one-half of each such connector assembly to respective sections of the garment as shown in FIG. 2. Such connector assemblies are fully described in aforementioned application Ser. No. 07/404,887. Note that the fuse 28a within control system 10 also provides protection against short circuits.

The use of these types of connectors 34 and 37, as shown in FIG. 2 and mentioned earlier herein, with each zone 24a-24e of the garment 26 allows the garment 26 to be readily configured as desired by the wearer to adapt to specific weather conditions and activity requirements of the wearer. It should also be appreciated that connectors may be used elsewhere, for example, at the shoulder, to make the arm section 26b and arm zone 24b individually detachable from the torso section 26c.

The fabric used to construct the long-sleeve shirt section 26bc and pants section 26e of the garment 26 may be any suitable fabric, but very preferably is a THERMAX-LYCRA blend woven or knit into lightweight fabric. Such fabric is now commercially available from E. I. du Pont de Nemours and Co., of Wilmington, Del. ("DuPont"). This fabric has been chosen for its superior wicking capability, i.e.m its ability to absorb perspiration from the skin and dissipate it rapidly through evaporation, its light weight, and its ability to be sewn up into garments that are comfortable, stretchable, and yet are tight-fitting. The hand and feet sections 26a and 26d may similarly be made from any suitable fabric, but preferably are made from 100% DACRON knit fabric. LYCRA is a trademark of DuPont for its brand of spandex, i.e., fiber including a long-chain synthetic polymer such segmented polyurethane that imparts elasticity to garments such as girdles, socks, and special hosiery. THERMAX is a trademark of DuPont for its brand of highly insulating synthetic polyester fiber. DACRON is a trademark of DuPont for its polyester fiber made from polyethylene terephthalate. Further details of the preferred fabric and construction techniques used to assemble various sections of the garment 26 are described in aforementioned applications Ser. No. 07/404,827 and Ser. No. 07/405,627.

The heating elements 22a-1-22d-2 themselves may be sewn against the inside of the garment 26 fabric, i.e., that side which is in contact with the skin, or on the outside of the fabric. For example, if the outside is chosen, the physical presence of the wire outside the layer of fabric will not interfere with or degrade the action of the fabric in wicking away perspiration from the skin.

The resistive heating elements 22a-1-22f themselves will preferably each be made of a continuous piece of suitably sized multi-strand copper wire to facilitate flexion in all directions without breakage. Suitable gauges for the wire are 20 to 33 gauge (AWG), with 26 gauge being preferred for the shirt and pants sections, and 28 gauge for the hands and socks sections. They will each also be enclosed within extruded nylon or tetrafluoroethylene insulation, with the overall wire preferably having a diameter or thickness in the range of about 0.010 to 0.100 inches and preferably about 0.050 inches. An insulated heating wire such as was just described will be able to provide a level of heat to the skin of the wearer which corresponds to at least about 100° Fahrenheit, without producing an uncomfortably warm sensation against the skin of the wearer of the garment 26. The copper wire will also preferably have a consistent percent quantity of copper from suit to suit to provide an accurate and repeatable temperature to resistance relationship. The resistance of the wire will be in the range of about 0.005 ohms/foot to about 0.100 ohms/foot, and preferably between about 0.30 ohms/foot and about 0.50 ohms/foot.

FIG. 3 shows a panel 200 of fabric used to make a sleeve or arm, such as the left arm section 26b-1 of the garment section 26 of FIG. 2. The panel 200 has two longitudinal edges 202 and 204 which are sewn together to form a conventional sleeve seam, wrist edge 206, and curved edge 208, which forms part of the shoulder seam. FIG. 3 illustrates a typical serpentine pattern 210 in which the wire heating element 22b-1 is preferably arranged on the left arm section 26b-1. Similar serpentine patterns are preferably used for the other heating wires 22c, 22e and 22f in the arms, torso and leg sections of garment 26. It should be understood, however, that variations in the serpentine pattern 210 may be made to adapt it to other parts of the garment 26 such as the torso. The critical concern of any serpentine or other pattern used is that there are no sharp bends in the wire heating elements 22, which would likely significantly increase the chance of breakage, as the body panel or section of the garment 26 into which the heating wires 22 are sewn move and stretch during repeated wearings. The serpentine pattern 210 addresses this concern well, however, as it allows the heating elements 22a-1–22d-2 to bend and flex easily and even move relative to the fabric well and stitching surrounding it without breaking while the garment 26 is being stretched in various directions while being worn.

The serpentine pattern 210 of FIG. 3 further provides a more uniform distribution of the heat produced by each heating element 22 of the garment 26 which is so arranged. As such, when the left arm section 26b-1 is sewn into its final constructed form, the various areas of the left arm section, (i.e., upper arm, lower arm, front and back of the arm) will all be heated relatively uniformly by the heating element 22b-1.

FIG. 3 also shows electrical connector assembly 37a-1 for providing power to the wire heating element 22a-1 in the left hand covering or glove 26a-1 (not shown in FIG. 3). Power is provided to connector 37a-1 via electrical conductors 217a-1 and 217a-2 which are routed along the longitudinal edges 202 and 204 respectively of fabric panel 200.

In FIG. 4, an enlarged, fragmentary, perspective, view of heating element 22b-1 showing the manner in which it is stitched in place in the fabric panel 200 of FIG. 3. From FIG. 4, it can be seen that the cover stitching 220 holding heating wire 22b-1 in place zigzags back and forth across the wire and is sufficiently tight such that it draws portions 200a and 200b of the fabric 200 located adjacent opposite sides of the wire upwardly to partially circumscribe the heating element 22b-1, thereby creating a continuous elongated pocket or trough 224 of semi-circular or U-shaped cross-section enclosing most of the heating element 22b-1. The stitching 220 is also preferably quite dense so as to almost completely enclose the surface of the heating element 22b-1 which is not covered by the fabric 200 of the arm section 26b-1. In other words, individual adjacent portions of the continuous thread forming the stitching are closer together than shown in FIG. 4. The stitching pattern of FIG. 4 provides a method for securely holding the heating elements 22b-1 in place within the fabric of the arm section 200 while still allowing the heating element 22b-1 to flex and stretch slightly with the movements of the wearer of the garment 26, thus promoting flexibility of the garment 26 and further reducing the chance of breakage of the heating element 22b-1. Additionally, this stitching arrangement allows the wire heating element 22b-1 to move longitudinally relative to adjacent fabric portions 200a and 200b within the pocket 224. This arrangement is preferably used in all of the garment sections, and further improves resistance to wire breakage and the flexibility and comfortableness of the garment sections.

A preferred construction for the heating element 22 is illustrated in FIGS. 4 and 5 and includes four conducting elements 240 of circular cross-section packaged within an electrically insulating jacket 242. Each conducting element 240 includes two tinsel-like conductors 244 and a high-strength flexible core portion 246 made up of several smaller synthetic fibers 248. The insulating jacket 242 is preferably made from a fluoropolymer resin and has a thickness of preferably about 0.02 to 0.3 inches. In addition, it is preferred that the insulation be fume-free and also be relatively chemically inert. An insulation having the above characteristics is "Tefzel", a fluoropolymer resin commercially available from DuPont.

The number of conducting elements 240 of a particular heating element 22 may range from one to about 20 (or more), with at least two and preferably with at least 6 to 10 being included within the insulating jacket 242. Including between about 2 and 20 conducting elements 240 within heating element 22 provides good flexibility and also helps to resist intermittent or complete electrical or mechanical breaks within the heating element.

In FIG. 5 the tinsel-like conductors 244 and the core portions 246 of each conducting element 240 are shown more clearly. Each conducting element 240 contains at least one, and preferably at least two or more, tinsel conductors 248 wound in a spiral fashion around its associated core portion 246. Further details about the construction of heating elements are given in aforementioned application Ser. No. 07/404,872.

Figure 6:
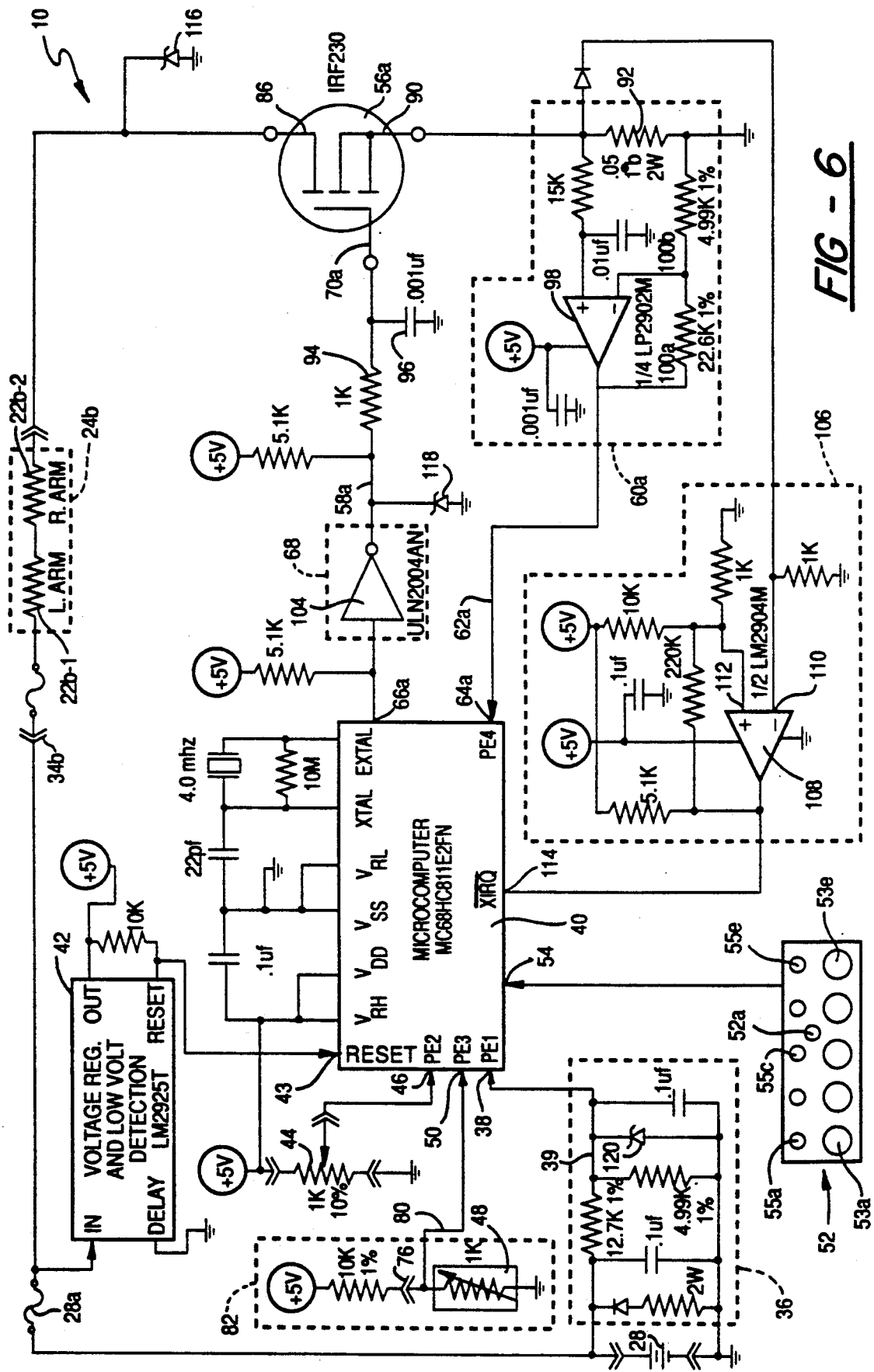
FIG. 6 is an electrical schematic diagram illustrating the typical circuitry for the present invention used for controlling the temperature level of one of the heating zones, namely the zone comprising the arms of the garment.

In FIG. 6 there is shown an electrical schematic diagram of a single heater control circuit for controlling heater elements 22b-1 and 22b-2 of FIG. 1. While FIG. 6 shows only the circuitry for controlling one of the six heating zones 24 of the garment 26, those skilled in the art will appreciate that this typical circuit of FIG. 6 may be replicated for each of the other heating zones 24 of the garment 26. Also, a number of the components of the circuitry, such as microcomputer 40 and temperature sensing device 48, as shown also in FIG. 1, only need be provided once in the overall control system 10.

The power supply 28, which may be a +12 VDC battery as shown, provides +12 VDC at connector 34b, which in turn supplies +12 VDC to heating elements 22b-1 and 22b-2. The +12 VDC power provided to heater elements 22b is unregulated, i.e., it is not filtered first, since the manner in which the control system 10 computes the power being provided to each zone will automatically compensate for any variations in the unregulated voltage supplied by power supply 28. The unregulated voltage from power supply 28 is also applied to the voltage divider network 36 and reduced thereby to provide a first reference voltage 39 representative of the battery voltage 28 at any given time, and then input to the first A/D port 38 of the microcomputer 40.

It should be appreciated, however, that other power sources other than a battery pack may be used. For example, an alternating current power source could also be used in lieu of a battery if conventional rectification circuitry is also provided. As another example, the +12 VDC power available from a motor vehicle such as a pick-up truck, jeep or snowmobile could be used in place of the battery. Such alternative power sources could be connected to the control system 10 by a suitable umbilical cord or power cable of a conventional design. If batteries are used, a suitable battery pack of conventional design may be provided adjacent to the printed circuit board or enclosure housing the microcomputer 40.

In the preferred embodiment, connectors 34a, 34b and 34c will be connecting +12 VDC to one-half of the garment 26 (i.e., the upper half) while connectors 34d, 34e and 34f will be connecting +12 VDC volts to the lower half of the garment 26. The heater elements 22b-1 and 22b-2 are shown circumscribed by a dashed line 26b, meant to represent the arms 26b of the garment 26 (illustrated more clearly in FIG. 2), within which the heater elements 22b-1 and 22b-2 are disposed.

The microcomputer 40 is preferably an 8-bit microcomputer with internal A/D conversion capability accessed through 8 A/D ports. The microcomputer 40 receives information from the wearer adjustable temperature control, 44 which may be a potentiometer as illustrated, on its second A/D input port 46. A varying reference voltage 80 from a voltage divider 82 is provided on the third A/D input 50 of microcomputer 40. The varying reference voltage 80 will correspond to the temperature sensed by the temperature sensing device 48, illustrated as a thermistor, within the divider network 82. The reference voltage provided on line 80 to input port 50 is used in conventional fashion by the software as a temperature reference in order to provide a means for more accurately calibrating the temperature sensed by the Ohm's Law method provided above. For more accurate temperature sensing the thermistor 48 may be located at a point external of the system circuit board, as indicated by connector 76.

The system 10 of FIG. 6 further includes an N-channel enhancement mode metal oxide semiconductor field effect transistor (MOSFET) 56a as the heater switch. Although a variety of semiconductor devices, such as a bipolar junction transistor could be used in lieu of the MOSFET 56a as the switching element, the MOSFET has been chosen for its low-power consumption. The MOSFET 56a has its drain 86 connected to one side of heating element 22b-2, and its source 90 connected to a current sensing resistor 92. The gate 70a of the MOSFET 56a, or switching input as it was referred to in the FIG. 1 discussion, is further shown connected in parallel with a resistor 94 and capacitor 96. Resistor 94 and capacitor 96 operate to provide an RC time constant for slowing down the switching action of the MOSFET 56a to thereby eliminate inductive voltage transients that would otherwise arise in the heating elements 22b from the extremely fast switching action of the MOSFET 56a.

An operational amplifier 98, preferably configured by resistors 100a and 100b to provide a gain of about 5.5, provides an analog input to the fourth A/D port 64a of the microcomputer 40 representative of the voltage drop across the current sensing resistor 92 when the MOSFET 56a is turned on. Together, the op-amp 98 and current sensing resistor 92 represent the current sensing network of FIG. 1, and are indicated as such by dashed line 60a.

Using Ohm's Law, the microcomputer 40 divides the voltage received at its fourth A/D input 64a by the resistance value of the current sensing resistor 92, taking into account the gain provided by the op-amp 98, to determine the actual current flowing through the left arm 22b-1 and the right arm 22b-2 heating elements. Using Ohm's Law again, the microcomputer then divides the first reference voltage 39 measured at its first A/D input 38 by the actual current flowing through the heating elements 22b to determine the actual resistances of the heating elements 22b at a given time.

Since the resistances of the heating elements 22b vary in accordance with their temperatures in a known manner, the microcomputer can determine the mean ambient temperature of the heating elements 22b by using the second reference voltage 80 in conjunction with the actual resistance of the heating elements 22b. Once this is determined, the temperature of the zones 24b may be calculated by multiplying the temperature of the heating elements 22b by a constant of portionality (C). The formula 102 for determining the temperature, $T_A$, of the heating elements 22b and 34a-2 is as follows:

$$T_A = \frac{R_{zone} - R_{ref}}{(K_1)(R_{ref})} + \text{Temp}_{ref}$$

where $R_{zone}$ is the actual, mean calculated resistance of the heating elements 22b in FIG. 6 at a given time; $\text{Temp}_{ref}$ is a known reference temperature sensed by the thermistor 48; $R_{ref}$ is the resistance of the heating elements 22b at the reference temperature ($\text{Temp}_{ref}$) sensed by the thermistor 48; and $K_1$ is a constant representing the temperature co-efficient of the material being used for the heating elements 22b, which will be approximately 0.0039 for substantially pure copper.

As mentioned previously, the temperature of the heating element 22b is proportional to the temperature of the zone 24b, represented by a constant of proportionality (C). Therefore, once the mean temperature of the heating elements 22b is obtained, the actual temperature of the zone 24b may be calculated by the following formula $T_{zone} T_A/C$. The proportional, desired temperature ($TD_x$) for each zone 24a-24f is calculated using the formula:

$$T_{Dx} = (T_{zone/master})(C_{fx})$$

where $TD_x$ represents the desired, proportional temperature of a particular zone, x; $T_{zone/master}$ represents the temperature of the zone 24 for the body part with the highest heat loss; and $C_{fx}$ represents the comfort factor of the zone 24 having its duty cycle proportionately adjusted.

Once $T_A$ and $T_S$ are determined, the necessary adjustments to the duty cycle of the pulse width modulated signal ($PWMdc_{ADJ}$) for a particular zone 37a-37e may be calculated by the microcomputer 40 using the following formula:

$$PWMdc_{AJD} = PWMdc_{current} + [(T_{zone} - T_D) \times \text{Gain}]$$

where $PWMdc_{current}$ is the current duty cycle being applied by the microcomputer 40, and the Gain is a constant having a value of preferably about 10–200, and preferably about 100.

A principal advantage provided by this method of temperature sensing/calculation is thus the ability to determine the temperature of each zone independently of the others without the need for discrete temperature sensors, such as one or more thermistors, to be disposed within each zone 24a-24e of the garment. In effect, the heating elements 22 are used not only to provide heat, but also as temperature sensing devices to monitor the ambient temperature within the zones 24, thereby enhancing the efficiency and reliability of the system 10 while reducing the costs which would otherwise be associated with providing a plurality of thermistors and related circuitry.

Another advantage of the above-mentioned method of temperature calculation in the serpentine pattern 210, as was shown in FIG. 3, is that since the heating element wire 22b-1 winds around a zone 24b, it inherently can be used to obtain an average temperature of the zone since it is spread over the zone and is therefore fairly insensitive to localized hot or cold spots within the zone. In this regard, use of the heating wires 22 as temperature elements is superior to using an individual thermistor, or thermistors, which inherently only sense the localized area in which they are placed.

Once the ambient temperature of the zone 24b is determined, the microcomputer 40 will compare that temperature with a corresponding temperature selected by the wearer via the potentiometer 44. The microcomputer 40 will then adjust the duty cycle of the pulse width modulated signal being output at its first output 66a, to compensate for the difference between the temperature selected from the potentiometer 44 and the actual temperature of the zone 24b. Initially the duty cycle will start out very low, preferably at about 2% or 3%. Then the system 10 determines whether the actual temperature of the zone 24b is less than the temperature selected by the potentiometer 44. If so, the duty cycle of the pulse width modulated signal will then be increased, preferably in steps of no greater than a preset maximum, preferably in the range of 10% to 25%, each time the temperature of the zone 24ba is sensed by the microcomputer 40. If the temperature of the zone 24b is greater than the temperature selected by the potentiometer 44, the duty cycle will remain at its initial, small value.

In the preferred embodiments, the frequency of the pulse width modulated signals applied by the microcomputer 40 will be preferably about 10 Hz-15 Hz, and the duty cycle value of the pulse width modulated signal applied to each zone 24 will be updated (i.e., changed if needed) at least once every 0.7 seconds. When the duty cycle of the pulse width modulated signal is increased or decreased in steps of 10%-25% each time the zones 24 are sensed for their temperatures, the microcomputer 40 can thus provide full power (i.e., a 100% duty cycle), within seven seconds or less, thereby ensuring quick system response time to rapid changes in temperature within the zones 24 of the garment 26.

Turning now to the set-up and calibration procedures for the suit, a wearer of the garment 26 will first initialize the suit by activating a "learn mode" from the operator control/display 52, preferably before the suit is put on, and while all of the zones 24 are at the same temperature. This is accomplished by holding down switch 52a of the operator control/display 52 while powering on the system 10. The learn mode is used to determine the reference temperature, $Temp_{ref}$ and the corresponding reference resistance, $R_{ref}$. When the learn mode is activated, the microcomputer 40 will read the voltage input on its third A/D port 50 from the thermistor 48. By using a look-up table containing predetermined temperature figures for various voltages of the thermistor 48, stored in its electrically erasable, programmable, read-only memory (EEPROM), or a suitable equation, the microcomputer 40 will determine $Temp_{ref}$. The reference resistance, $R_{ref}$, of each heating element 22 will be determined by the microcomputer 40 turning on each heating element 22a-1-22f sequentially for a brief time, such as a tenth of a second, and measuring the current through each heating element 22 and the voltage applied to each heating element 22. Using Ohm's Law (i.e., R=E/I), $R_{ref}$ can then be obtained.

Next, the wearer may initiate a "calibration mode" from the switch 52a. The calibration mode, which may be activated at any time after the system 10 has been powered up and has completed its learn mode computations, enables the wearer to customize the suit to provide for different power distributions to the various heating elements 22 of the garment 26. More specifically, the calibration mode enables the wearer to tailor the amount of heat produced by the heating element(s) 22 of each zone 24, and thus the ambient temperature of each zone 24, to suit specific environmental conditions and specific activities of the wearer, as well as to take into account the degree of insulating ability of the outwear being worn over the garment 26. For example, if only a vest is being worn over the upper body portion of the garment 26, the heat supplied by heating element 22c of the torso zone 24c may be adjusted accordingly to take into account the fact that the torso zone 24c will likely not require as much heat as, for example, the arms zone 24b. Once the calibration mode is complete, the system 10 will maintain the power applied to each heating element 22, as selected by the wearer during the calibration mode. It should be noted that an enclosure suitable for enclosing the operator control/display 52 is disclosed in U.S. application Ser. No. 07/405,627.

To initiate and proceed through the calibration procedure, the wearer first depresses switch 52a to activate the calibration mode and allow the duty cycle for one zone, for example, zone 24b, to be adjusted from potentiometer 53. The wearer will then adjust the duty cycle of the pulse width modulated signal supplied by the microcomputer 40 via potentiometers 53 until a comfortable temperature level is reached in that particular zone. The microcomputer 40 will then store a Comfort Level Factor, $C_f$, representative of the calibrated duty cycle in its EEPROM, which will also be explained in more detail shortly, which it will use as a reference in maintaining that zone 24 at the calibrated temperature level. Once the Comfort Level Factor is determined and stored in the EEPROM there will be no need for further calibration of that particular zone 24 unless environmental conditions or the wearer's activities change so as to make the calibrated temperature level of that zone 24 undesirable.

Once one zone 24 has been calibrated as described above, another zone will be calibrated in identical fashion by adjusting the potentiometer 53 associated with the next zone 24 to adjust the duty cycle for the next zone 24. This procedure will be repeated until all the zones 24 have been calibrated so that all the heating elements 22 provide a comfortable ambient temperature level within their respective zones 24.

The Comfort Level Factors for each zone 24 are further related by the microcomputer 40 to enable it to proportionately adjust each zone 24 just the right amount to maintain the correct, or comfortable, temperature balance of the zones; as selected by the wearer. The microcomputer 40 accomplishes this by a single mathematical algorithm that may be stored in its EEPROM. By first assuming that particular body parts will be more susceptible to heat loss, it may then be assumed that certain heating elements 22 must supply more heat than others. For example, it may be assumed that the hands are more susceptible to heat loss than the feet, which in turn are more susceptible to heat loss than the arms, which in turn are more susceptible to heat loss than the legs 24e, which in turn lose heat faster than the torso. As such, the heat generated by the heating elements 22 of the zones 24 should be adjusted to conform to these assumptions. Thus, assuming that the power delivered to each zone 24 must be adjusted in accordance with the above assumed respective heat loss susceptibility of the body parts covered by the zones 24, and further setting the Comfort Level Factor of the zone having a body part likely to suffer the highest heat loss, i.e., the hands zone 24a, to a factor of one, the following relationships may be assumed by the microcomputer 40:

$$\frac{P24a}{P24a} = 1 = Cf_{zone\ 24a}$$

$$\frac{P24a}{P24a} > \frac{P24d}{P24a} > \frac{P24b}{P24a} > \frac{P24e}{P24a} > \frac{P24c}{P24a}$$

Therefore $$\frac{P24d}{P24a} = Cf_{zone\ 24d}$$

$$\frac{P24b}{P24a} = Cf_{zone\ 24b}$$

$$\frac{P24e}{P24a} = Cf_{zone\ 24e}$$

$$\frac{P24c}{P24a} = Cf_{zone\ 24c}$$

where P24a is the total power applied to heating elements 22a-1 and 22a-2; P24d is the total power applied to heating elements 22d-1 and 22d-2; P24b is the total power applied to 22b-1 and 22b-2; P24e is the total power applied to heating elements 22e and 22f; and P24c is the power applied to heating elements 22c.

By using the above-described ratios, the microcomputer 40 can mathematically determine the correct, proportionate, desired change in the duty cycle to be applied to each zone 24 when the duty cycle of the zone 24 most susceptible to heat loss, in this example the hands zone 24a, is updated by the microcomputer 40.

To further assist the wearer of the garment 26 in monitoring its operation, a plurality of LEDs 55 have been provided. At least one LED 55 will be independently provided for each zone 24 and each LED will be activated by a variable pulse-like signal from input port 54 of the microcomputer 40. In the preferred embodiment of the invention all of the LEDs 55 will be flashed simultaneously in intermittent fashion by the pulse-like signal to indicate to the wearer that the learn mode has been activated. To indicate that the calibration mode has been selected, and which zone 24 is being calibrated, the microcomputer 40 will send a pulse-like signal operable to flash on and off intermittently the LED 55 for the zone 22 being calibrated. During normal operation, i.e., when neither the learn or calibration modes have been activated, the LEDs 55 will all remain off. While the above flashing patterns are believed to provide a particularly simple and easy to understand indication of the status of the learn and calibration modes, it should be apparent that numerous patterns and LED configurations could be employed to indicate the above-mentioned modes, as well as other operations of the system 10, such as an automatic increase or decrease in current to the heating elements 22.

While the internal circuitry of the LED status display and operator input selection device 52 has not been shown in FIG. 6, it should also be appreciated that conventional LED driver/logic circuitry could be used to drive the LEDs to produce the desired, intermittently flashing patterns described above. Likewise, the circuit connection of the operator control/display 52 and the LEDs 55 are well known in the art, and as such have not been illustrated.

Referring back to FIG. 6, once the proper pulse width modulated signal is determined and applied by the microcomputer 40 to first output 66a, the signal is input to an inverting amplifier 104 within the output buffer 68, and then to the gate 70a of the MOSFET 56a. The pulse width modulated signal operates to turn on the MOSFET 56a for a time in accordance with the duty cycle of the pulse width modulated signal, thereby allowing current flow through the heating elements 22b for a like period of time, and thus generating heat within zone 24b. The next time the zone 37a is sensed, the duty cycle will be increased, decreased, or will remain the same, depending upon whether the temperature of the zone 24b is greater than, less than, or equal to the temperature selected by the wearer adjustable potentiometer 44. This sequence of repetitively sensing each zone 24 for its temperature and applying a corrective, pulse width modulated signal is further illustrated in the flow chart of FIG. 7 and discussed in the following paragraphs.

An overcurrent protection circuit 106 may optionally be included in the system 10, as shown in FIG. 6. The overcurrent protection circuitry 106 principally includes a comparator 108 and a network for applying a fixed reference voltage on its positive input 112. The comparator 108 compares the voltage on its negative input 110, which corresponds to the voltage drop across current sensing resistor 92, to the reference voltage applied at its positive input 112. If the voltage at the negative input 108 exceeds the reference voltage applied to the positive input 112, the comparator 108 applies a logic-low level signal to an active-low, external interrupt 114 of the microcomputer 40, which interrupts the pulse width modulated signal being applied at its output 66a for a predetermined amount of time.

Although the overcurrent protection circuitry 106 is shown in FIG. 5 as being operable to monitor the voltage drop across the current sensing resistor 92, it should be understood that the circuit 106 is actually operable to monitor the current sensing resistors for all the zones 24 simultaneously. This is accomplished by connecting the negative input 110 of the comparator 108 in parallel with the current sensing resistor(s) of each zone 24. In this manner, if the voltage drop across any of the current sensing resistors rises above a predetermined level, the comparator 108 will provide a logic-low level signal to the external interrupt 114 of the microcomputer 40, thereby interrupting the pulse width modulated output signals being applied by the microcomputer 40.

The circuit of FIG. 6 further includes additional protection in the form of a first zener diode 116 for suppressing inductive voltage transients developed by the heating elements 22b. A second zener diode 118 is also provided for preventing the voltage output by the output buffer 68 from exceeding a predetermined amount, and thereby damaging the MOSFET 56a. A third zener diode 120 within the voltage divider-filter and overcurrent protection network 36 provides similar over-voltage protection to the first A/D input 38 of the microcomputer 40.

Preferred parts for several of the components illustrated in FIG. 6 are as follows:

| Reference Numeral | Brief Description | Manufacturer | Part No. |
|---|---|---|---|
| 26 | 8-bit Microcomputer | Motorola | MC68HC811E2FN |
| 56a | Power MOSFET | Int'l Rectifier | IRFZ30 |
| 158 | Operational Amplifier | Nat'l Semiconductor | LP2902M |
| 154 | Output Buffer | Texas Instruments | ULN2004AN |
| 158 | Comparator | Nat'l Semiconductor | LM2904M |

Figure 7:
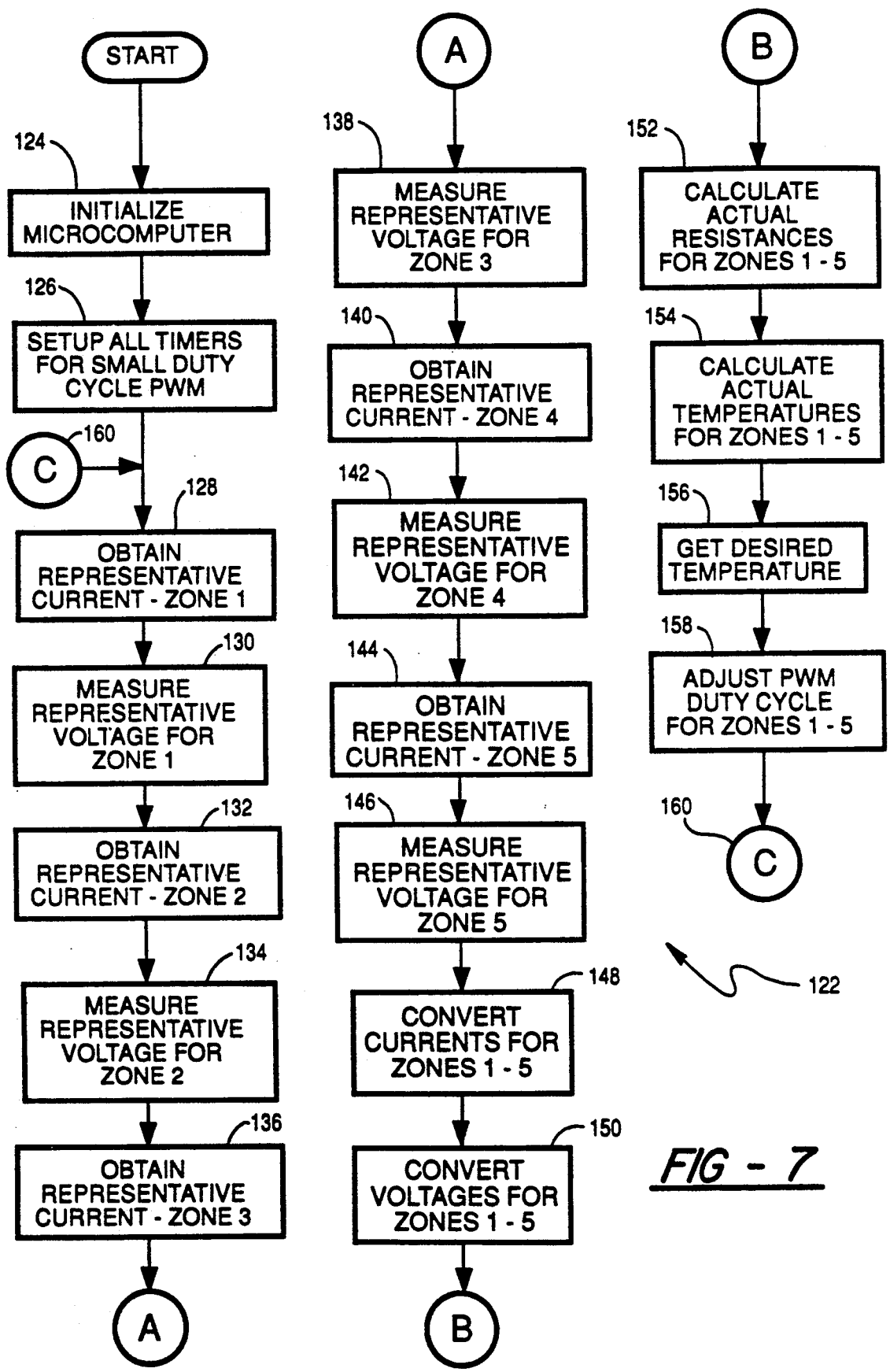
FIG. 7 is a flow chart of the steps performed by the FIG. 1 microcomputer in monitoring and applying control signals to the power switches of the various heating elements to regulate the temperature of each zone of the garment independently of each other zone.

In FIG. 7 there is shown a flow chart 122 illustrating the order of events performed by the microcomputer 40 in regulating the heat provided to each zone 24 of the garment 26. The microcomputer 40 is first initialized in conventional fashion as indicated by block 124 and then all the timers in the microcomputer 40 are set up for a small duty-cycle pulse width modulation, as indicated by block 126. The duty-cycle, as mentioned previously, will initially be preferably about 2% or 3%, and will be increased as needed by the microcomputer 40.

After the timers have all been set up, the representative current for zone one (e.g., zone 24a) is calculated as represented by block 128. This calculation is performed by reading the voltage across the current sensing resistor 92 of zone one 24a and dividing that value by the resistance of the current sensing resistor 92. Next, the voltage applied to the heating elements 22a for zone one 24a is measured, as indicated by block 130, at the first A/D port 38 of the microcomputer 40. The process of alternately calculating the current for each zone 24 and the voltage applied to the heating element 22 of each zone 24 is then repeated as represented by blocks 132-136 for the remaining zones two 24b through five 24e.

Once all the voltages and currents for each of the five zones 24 have been obtained and measured, the representative currents for the zones 24 will then be successively converted to actual current values, as shown by block 138. This step is necessary because the representative voltages for the zones 24 have been scaled to take advantage of the full range of the A/D ports by the op-amps of each current sensing circuit 60a-60e, thereby requiring additional mathematical manipulation to further scale the true current flowing through the current sensing resistor within each zone 24.

Next, the voltages applied to each heating element 22 will be converted, as represented by block 150, to account for the influence of the voltage divider, filter and overcurrent protection network 36 on the voltage being input to the first A/D port 38 of the microcomputer 40.

Once the true currents and true voltages for each zone 24 have been converted, the actual resistance for each zone 24 is calculated 152 by dividing the actual voltage applied at a given time to a particular zone 24 by the actual current flowing through the same zone 24. Once the actual resistances for each heating element 22 have been calculated, the actual ambient temperature of each zone 24 will be calculated, as represented by block 154, using the formulas explained in detail previously herein.

Once the actual temperatures for the zones 24 have been calculated, the desired temperature is obtained, as indicated by block 156, by the microcomputer 40 from the wearer adjustable potentiometer 44. The duty-cycles of the pulse width modulated signals applied by the microcomputer 40 to the gates of the MOSFETs 56 are then adjusted, as indicated by block 158, to either increase, decrease or maintain at a constant figure the MOSFETs 56 are conducting, and thereby increase, decrease or maintain at a constant figure the heat developed by the heating elements 22. In operation, the temperature of each zone 24 "tracks" the desired temperature set by the wearer from the potentiometer 44. The process is then repeated, as indicated by block 160, by beginning again with obtaining a representative current, as indicated by block 128, and measured voltage, as indicated by block 130, for each zone.

The above-described system 10 thus operates as a proportional, closed loop feedback/control system that automatically compensates for changes in the ambient temperature levels of the zones. As such, the need for the wearer of the garment 26 to make frequent temperature adjustments as weather conditions dictate is eliminated. Further, since this automatic feedback control operates independently for each zone, the system 10 also compensates for differences if any in the ambient temperatures experienced by each zone 24.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A portable, wearable electronic temperature control system for an electrically heated garment having at least first and second independent heating zones, with each such zone being provided with at least one heating element, the system comprising:
   means for selecting a desired temperature level to be maintained within the first and second independent heating zones;
   means for sensing substantially simultaneously actual temperature levels within each of the independent heating zones;
   a plurality of means for electronically switching on and off independently and substantially simultaneously the independent heating zones of the electrically heated garment;
   electronic means, receiving information from the temperature select means and temperature level sensing means, for controlling each of the switching means independently, whereby the desired temperature level selected via the temperature select means is independently achieved for each heating zone; and wearable enclosure means for housing at least the plurality of switching means and the means for controlling each of the switching means;

the temperature control system being sufficiently light in weight to be readily portable and wearable by a person wearing the electrically heated garment.

2. The system of claim 1, wherein the means for sensing actual temperature levels includes a plurality of means for sensing current flowing through the heating elements.

3. The system of claim 3, wherein the temperature level sensing means further includes means for detecting the voltage applied across the heating elements of the heating zones.

4. The system of claim 1, wherein:

the plurality of means for electronically switching on and off the heating zones include a plurality of solid-state power switching devices, with one such switching device being provided for each zone; and the means for controlling includes a microcomputer for generating substantially simultaneously a plurality of independently controlled pulse width modulated signals, with one such signal being provided to each of the solid-state power switching devices.

5. A portable, wearable electronic control system for regulating temperature within a plurality of discrete zones of an electrically heated garment for a person engaged in cold weather activities, with each such zone being provided with at least one heating element, the system comprising:

solid-state electronic means, having first, second and third inputs and a first output, for automatically controlling the operation of the control system;

means for selecting a desired temperature at which the zones of the garment are to be maintained and for providing information related thereto to the first input of the means for automatically controlling;

means for sensing an ambient temperature level associated with a particular location near the garment and providing information related thereto to the second input of the control means;

a plurality of independently controlled electronic on-off switching devices, with each such device being for independently enabling and disabling current flowing through a respective one of the heating elements to change selectively and controllably the temperature within the zone associated with such heating element by changing a duty cycle of the current flowing through such heating element;

means for sensing sequentially at predetermined intervals of time the current flowing through the heating element of each respective zone for providing information related thereto to the third input of the means for automatically controlling, and wearable enclosure means for housing at least the plurality of switching means and the means for controlling each of the switching means, the temperature control system being light in weight, portable and wearable by a person wearing the undergarment assembly, and the means for automatically controlling having means for high speed timing and means for outputting in parallel a plurality of timed digital control signals for selectively enabling and disabling the plurality of switching devices, to regulate independently the current flowing through each such heating element, and thereby regulate closely the temperature of each zone of the garment.

6. The system of claim 5, wherein the automatic control means is a programmed microcomputer.

7. The system of claim 5, wherein the temperature selection means includes a potentiometer, and the ambient temperature level sensing means is a thermistor.

8. The system of claim 5, further comprising a plurality of reactive heating elements formed of electrically conductive wires, each having a predetermined conductivity at a given temperature.

9. The system of claim 8, wherein the resistive heating elements are formed from multi-stranded electrically conductive wire being at least 98% pure copper.

10. The system of claim 5, wherein each of the current sensing means includes a shunt resistor used to sense current, and means for measuring voltage across such shunt resistor.

11. The system of claim 5, wherein each of the switching devices includes a power MOSFET having relatively high conductance when rendered fully conducting, thereby minimizing heating losses within the MOSFET.

12. An electronic temperature control system and electrically heated undergarment assembly for a cold weather garment having a plurality of separately heatable zones, the system comprising:

a lightweight, form-fitting undergarment assembly including a plurality of separately heatable zones and a plurality of independently controllable heating means, at least one such heating means being disposed in each such zone of the undergarment assembly, each such heating means being operable to generate heat in response to a current flowing therethrough;

means for sensing the temperature level of each of the heating means;

a plurality of independently controllable electronic switching means, each switching means being associated with a particular one of the heating means and operable to selectively enable and disable the current flowing therethrough; and control means, receiving information form at least the means for sensing temperature level, for selectively applying a plurality of independent signals at least in partial response to the received information to operate the plurality of electronic switching means, thereby controllably enabling and disabling the current flow through each heating means, and thereby selectively heating each zone of the garment independently of the others; and wearable enclosure means for housing at least the plurality of switching means and the means for controlling each of the switching means;

the temperature control system being light in weight, portable and wearable by a person wearing the undergarment assembly.

13. The system of claim 12, further comprising power supply means for providing DC electrical power of no more than about 24 volts across each of the switching means.

14. The system of claim 13, further comprising means for measuring the level of DC voltage provided by the power supply means.

15. The system of claim 12, wherein the means for sensing temperature includes a reference temperature sensing device.

16. The system of claim 12, wherein each of the means for sensing temperature includes a plurality of current sensing means, with each such current sensing means including a resistance device through which the current to be sensed flows.

17. The system of claim 16, wherein the control means is based around a microprocessor, and includes a plurality of analog-to-digital converters for transforming analog signals indicative of sensed currents to digital signals.

18. The system of claim 12, wherein:
the control means includes means forms part of the means for sensing temperature, and means for measuring the level of DC voltage applied to the control system from a power source; and
the means for sensing temperature further includes a plurality of precision resistance devices, with at least one such resistance device associated with each zone, for respectively facilitating measurement of the magnitude of current flowing through such zone;
whereby the electrical power dissipated at each such zone can be calculated in accordance with Ohm's Law.

19. The system of claim 12, wherein each said heating means includes an electrically conductive insulated wire element including multiple highly flexible conductors.

20. The system of claim 12, wherein the independent signals from the control means are pulse width modulated signals.

21. An electronic temperature control system for a cold weather garment having a plurality of discrete, independently heated areas, the system comprising:
temperature level selecting means for selecting a desired temperature at which each independently heated area of the garment is to be maintained;
thermistor means for sensing a representative ambient temperature that the garment is exposed to;
a plurality of independent heating means operable to generate heat in response to current flowing therethrough;
a plurality of independent current sensing means for sensing the current flowing through each of the heating means;
a plurality of solid-state switching means for independently enabling the current flowing through each said heating means;
reference means for providing a reference signal indicative of the voltage being applied to a particular said heating means at a given time; and
microcomputer means, receiving information from the temperature selection means, the thermistor means, each said current sensing means, and the reference means, for producing a plurality of pulse width modulated (PWM) signals, for controlling the switching means, whereby each of said switching means is operated independently, to control the average current flowing through each said heating means and the heat generated thereby.

22. The system of claim 21, wherein the temperature level selection means includes a potentiometer.

23. The system of claim 21, wherein the PWM signals are repetitively generated and each have a frequency of at least about five hertz when enabled.

24. The system of claim 21, wherein each heating means is an electrically conductive multi-stranded wire having an over-all gauge in the range of about 20 AWG to about 35 AWG.

25. The system of claim 21, wherein each current sensing means comprises a precision resistor used for current sensing and an amplifier for amplifying a signal obtained using the precision resistor.

26. The system of claim 21, wherein each switching means is a power MOSFET device.

27. The system of claim 21, wherein the reference means provides a voltage whose amplitude corresponds to the maximum nominal voltage applied to each heating means when such heating means has current passing therethrough.

28. A method for electronically regulating independently the temperatures of a plurality of discrete zones of an electrically heated garment for a person engaged in cold-weather activities, each such zone having at least one heating element, the method comprising the steps of:
selecting, for each such zone, a desired temperature level at which the zone is to be maintained;
sensing an actual temperature level in each zone by monitoring electrical current associated with at least one heating element in each of the zones;
determining, using the sensed electrical current, an actual temperature level of each such zone; and
regulating independently the temperature level of each such zone in accordance with the selected temperature level by independently providing to the heating element or elements of each such zone a selected amount of electrical power.

29. The method of claim 28, wherein a microprocessor is used to regulate the temperatures of the zones in a substantially simultaneous manner.

30. The method of claim 28, further comprising the step of generating a plurality of independent pulse width modulated signals to control the temperatures of the heating elements, and thereby control the temperatures of the zones in an independent fashion.

31. The method of claim 28, wherein the steps of sensing and determining an actual temperature level in each such discrete zone of the electrically heated garment uses Ohm's Law temperature dependance of resistance, and substeps including:
determining a voltage applied to a resistive heating element disposed in each such zone;
measuring current flowing through the resistive heating element in each such zone;
using Ohm's Law to calculate a resistance of the resistive heating element of each such zone from the determined voltage applied to, and the measured current flowing through, the resistive heating element; and
using the calculated resistance of the resistive heating element of each such zone to determine an associated, relative temperature level of the resistive heating element, and thus a relative temperature level of the zone within which the resistive heating element is disposed.

32. A method for regulating temperatures within a plurality of independent heating zones of a cold weather garment, the method comprising:

(a) providing a microprocessor having a plurality of inputs;

(b) using a plurality of wearer adjustable potentiometers to provide a plurality of first input signals to a plurality of first inputs of the microprocessor, the first input signals each being representative of a desired temperature level at which each zone of the garment is to be maintained;

(c) applying a plurality of first voltages to first sides of a corresponding plurality of electrically conductive elements, the elements each being operable to generate heat in response to current flowing therethrough;

(d) applying a second voltage corresponding to the first voltages to a second input of the microprocessor;

(d) using a plurality of current sensing resistors, each such resistor being associated with a particular one of the conductive elements, to provide a corresponding plurality of third input signals to inputs of the microprocessor representative of the current flowing through each such resistor;

(f) using a plurality of solid-state semiconductor switching devices, each such switching device being associated with a particular current sensing resistor and operable to interrupt the current flowing through the conductive element associated with the particular sensing resistor;

(g) using the microprocessor to determine an actual current flowing through each conductive element at a given time;

(h) using the microprocessor to determine an actual voltage being applied to the first side of each conductive element at a given time;

(i) using the microprocessor to determine, form the actual voltages being applied to and the actual currents flowing through each such conductive element, an actual resistance of each such conductive element at a given time;

(j) using the microprocessor to determine, at least in part from the actual resistances of each such conductive element, the actual temperature value of each zone at a given time;

(k) using the microprocessor to determine, from the actual temperature values of the zones, a plurality of pulse width modulated signals, with each pulse width modulated signal being associated with a particular conductive element of a particular zone, and operable to help force the actual temperature value of the particular zone toward the temperature level indicated by the input signal form the potentiometer associated with such zone; and (l) applying the pulse width modulated signals to the solid-state switching devices, thereby selectively switching the switching devices rapidly between a conducting state and a non-conducting state, thereby controlling the respective temperatures of the individual zones in accordance with the temperature levels indicated by their respective potentiometers.

* * * * *